June 23, 1959    J. BOYCE    2,891,591
FRUIT PROCESSING MACHINE
Filed Aug. 4, 1955    4 Sheets-Sheet 1
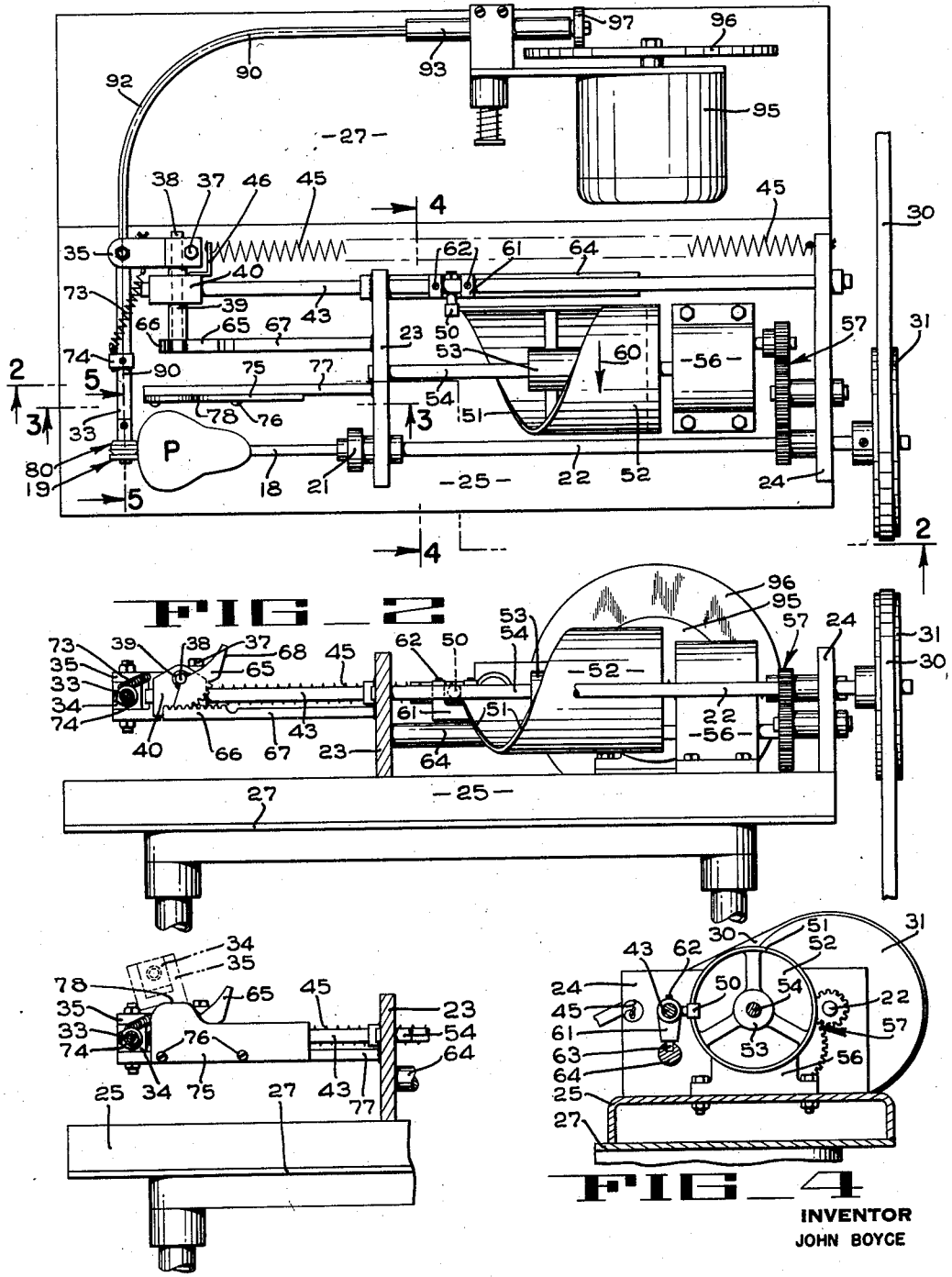
INVENTOR
JOHN BOYCE
BY Hans G. Hoffmeister
ATTORNEY

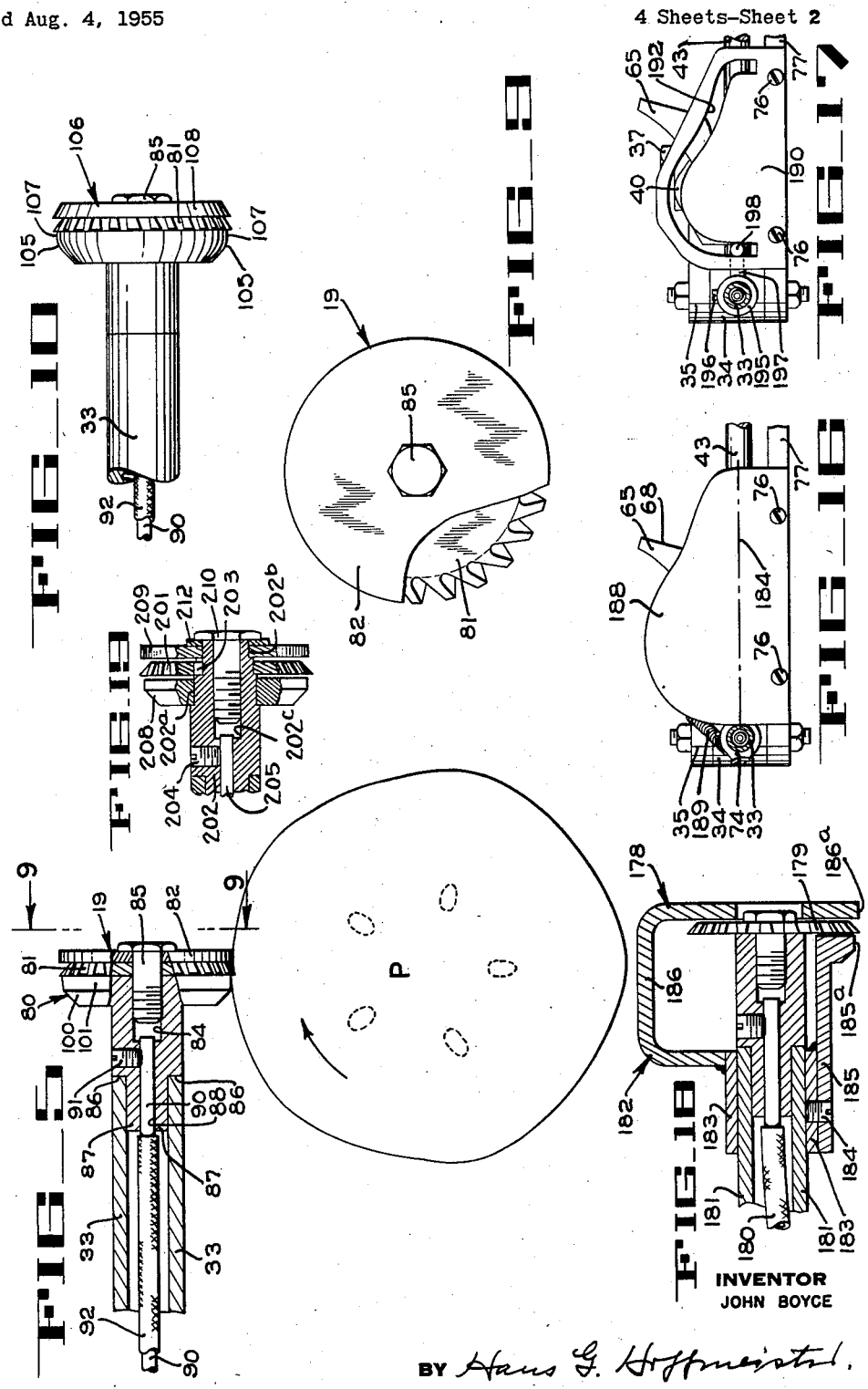

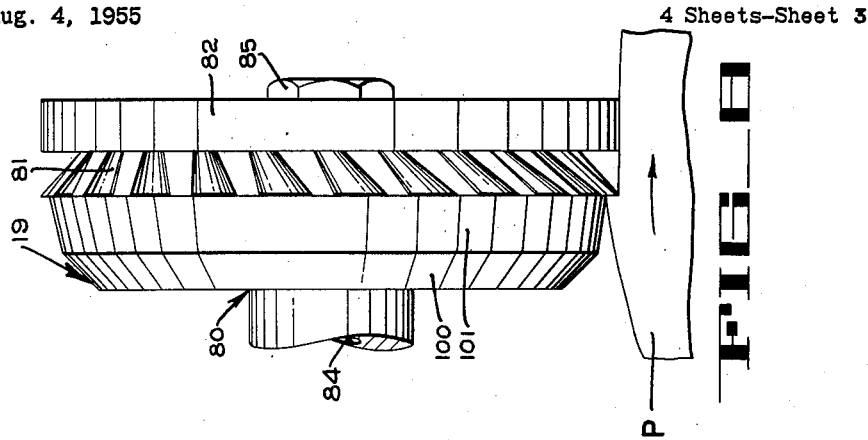
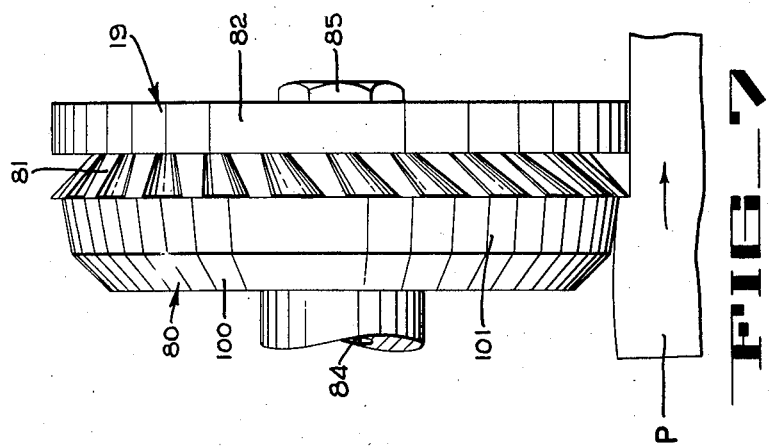
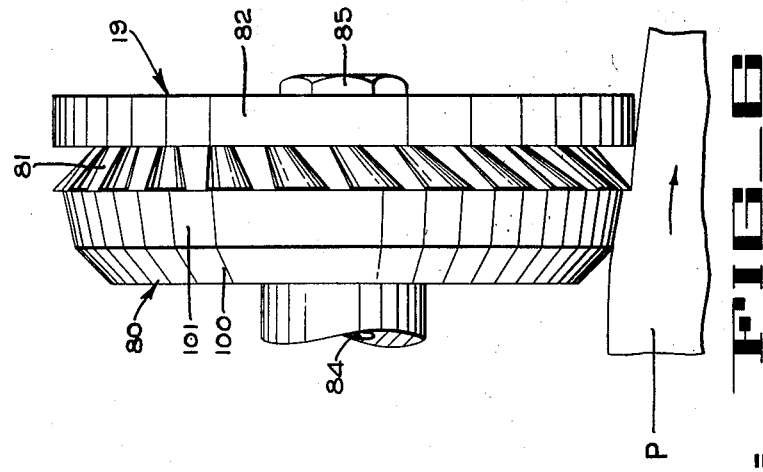

June 23, 1959 J. BOYCE 2,891,591
FRUIT PROCESSING MACHINE
Filed Aug. 4, 1955 4 Sheets-Sheet 4
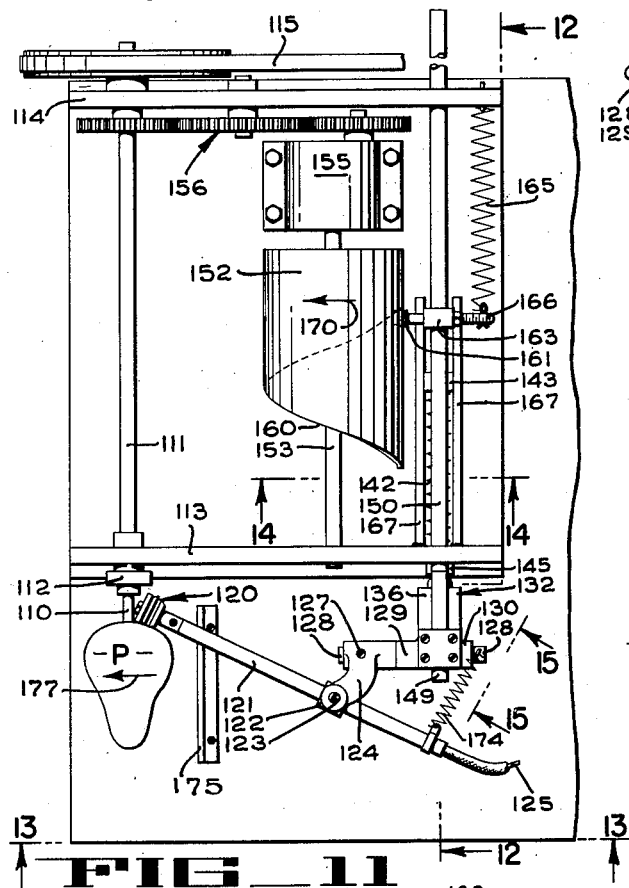
FIG_11
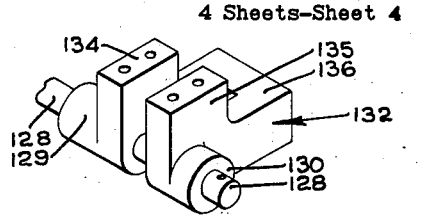
FIG_15
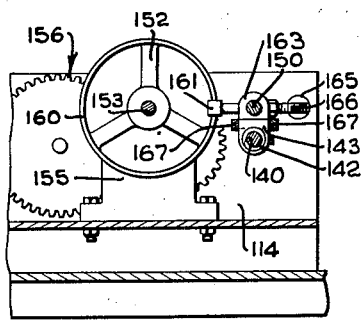
FIG_14
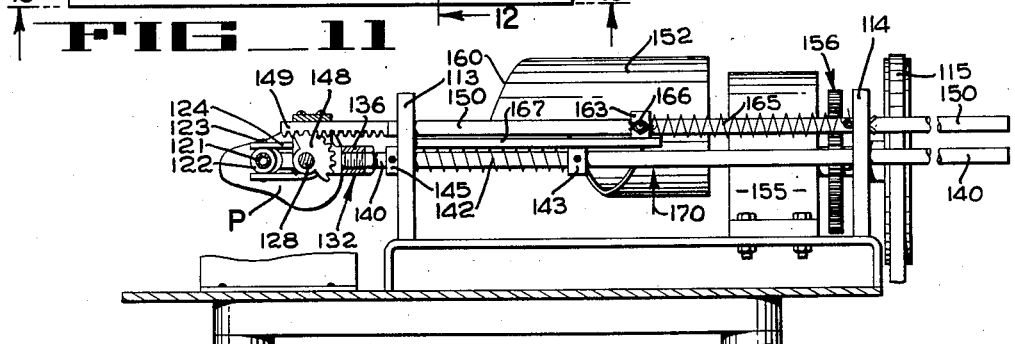
FIG_12
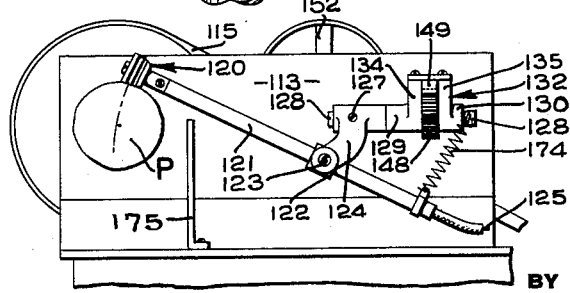
FIG_13
INVENTOR
JOHN BOYCE
BY *Hans G. Hoffmeister*
ATTORNEY United States Patent Office 2,891,591
Patented June 23, 1959

2,891,591

FRUIT PROCESSING MACHINE

John Boyce, San Jose, Calif., assignor to Food Machinery and Chemical Corporation, San Jose, Calif., a corporation of Delaware Application August 4, 1955, Serial No. 526,532

16 Claims. (Cl. 146—43)

This invention pertains to machinery for processing fruit, and more particularly relates to an improved apparatus for peeling fruit, such as pears or the like.

Fruit peeling machines in which rotating cutters are used have not been entirely satisfactory due, in a large measure, to the fact that it is difficult to control the depth of cut of rapidly rotating cutters as they move over the curved surface of a pear. Unless the cutters are under the positive control of adequate gauges at all times, the rapidly rotating cutters have a tendency to dig into the surface and remove excessive quantities of the meat of the fruit.

An object of the present invention is to provide a fruit peeling machine of the rotary cutter type which will efficiently remove peel from the fruit.

Another object is to provide improved means for controlling the depth of cut of a rotary peeling cutter.

Another object is to provide an improved rotary cutter head for a fruit peeling machine.

Another object of the present invention is to provide an improved mechanism for contour peeling pears or the like.

Other and further objects and advantages of the present invention will become apparent from the following description taken in connection with the accompanying drawings, in which:

Fig. 1 is a plan of the pear peeling machine of the present invention.

Fig. 2 is a fragmentary vertical section taken along line 2—2 of Fig. 1.

Fig. 3 is a fragmentary vertical section taken along line 3—3 of Fig. 1.

Fig. 4 is a fragmentary vertical section taken along line 4—4 of Fig. 1.

Fig. 5 is an enlarged fragmentary end elevation, with parts broken away and parts in section, of a portion of the machine of Fig. 1, taken in the direction of arrows 5—5 of Fig. 1, and particularly showing the cutter assembly after it has moved up over the butt end of a pear.

Figs. 6, 7 and 8 are enlarged views of the cutter assembly of Fig. 5, each view showing a different operating position of the cutter.

Fig. 9 is an enlarged end view, partly broken away, of the cutter assembly of Fig. 5, taken in the direction of arrows 9—9 of Fig. 5.

Fig. 10 is a view similar to Fig. 5 but showing a modified cutter assembly.

Fig. 11 is a fragmentary plan of a modified form of the pear peeling machine of the present invention.

Fig. 12 is a fragmentary vertical section taken along line 12—12 of Fig. 11.

Fig. 13 is a fragmentary end elevation of the machine of Fig. 11, taken in the direction of arrows 13—13 of Fig. 11.

Fig. 14 is a fragmentary vertical section taken along line 14—14 of Fig. 11.

Fig. 15 is an enlarged isometric view of one of the elements of the peeling machine shown removed from the machine, the view being taken in the direction indicated by arrows 15—15 of Fig. 11.

Fig. 16 is a vertical section taken along line 3—3 of Fig. 1, particularly showing a modified guide plate which is used to adapt the machine of Fig. 1 for the contour peeling of pears.

Fig. 17 is a vertical section, similar to Fig. 16, showing a second modified guide plate which is also used in the contour peeling of pears.

Fig. 18 is a fragmentary vertical section taken centrally through a modified cutter and guide assembly.

Fig. 19 is a fragmentary central longitudinal section of another embodiment of the rotary peeler of the present invention.

In the pear peeling machine of the present invention, a pear P (Fig. 1) is impaled along its stem-blossom axis on a continuously rotating rod or stemming tube 18. A cutter assembly 19, which has a rapidly rotating cutting blade, is moved over the surface of the rotating pear in a direction lengthwise of the pear from the butt end to the stem end, following a generally spiral-shaped path as it removes peel from the surface.

The pear support tube 18 (Figs. 1 and 2) is secured by a coupling 21 to a shaft 22 which is journalled for rotation in two walls 23 and 24 projecting upwardly from a platform 25 that is mounted in spaced relation above a table top 27 (Figs. 1 and 4). The shaft 22 is driven by a motor (not shown) through a belt 30 trained around a pulley 31 keyed to one end of the shaft.

The cutter assembly 19, to be described in detail hereinafter, is mounted on the end of a support tube 33 (Fig. 1) which has a hub 34 (Fig. 3) pivotably mounted between the arms of a yoke 35. The yoke 35 is clamped by means of a bolt 37 to a shaft 38 which is rotatably journalled in a bearing sleeve 39 that is pressed in a support block 40 (Figs. 1 and 3). The support block 40 is secured in fixed position on the end of a rod 43 which is slidably journalled in the walls 23 and 24. A spring 45 (Fig. 1) is anchored at one end in the wall 24 and at the other end in a lateral extension 46 of the block 40 and tends to draw the block 40 and the shaft 38 toward the wall 23. Movement of the block 40 toward the wall 23 is prevented by a cam roller follower 50 which is secured to the rod 43 and bears against the camming surface 51 of a barrel cam 52. The cam 52 has a central hub 53 keyed to a shaft 54 that is journalled in the wall 23 and disposed in driven engagement in a speed reducer 56 that is connected through a train of gears 57 with the drive shaft 22. It will be evident that, when the barrel cam 52 is rotated in the direction of arrow 60 (Fig. 1), the camming surface will progressively move away from the cam follower 50, permitting the spring 45 to draw the block 40 and the shaft 38 toward the wall 23, whereby to cause the cutter assembly 19 to move lengthwise along the pear from the butt end to the stem end. Rotation of rod 43 is prevented by a guide member 61 (Figs. 2 and 4) which is secured by setscrews 62 to the rod and has a tongue 63 disposed in guided relation in a groove in a stationary rod 64 that is mounted in parallel relation below the rod 43.

During the initial part of the movement of the block 40 toward the right from the position of Fig. 1, the yoke 35 is moved from the substantially horizontal, full-line position of Fig. 3 to the dotted line position. This pivoting of the yoke carries the cutter 19 from the position of Fig. 1, adjacent the center of the butt end of the pear, to the position of Fig. 5 in which the cutter is on the upper side of the pear. Pivoting movement of the yoke 35 is accomplished during the initial movement of the block 40 by the engagement of a gear segment 65 (Fig. 2), which is welded to the shaft 38, with a rack 66 formed on a rigid rod 67 of square cross-section that is secured to and projects away from the wall 23. When the yoke 35 reaches the desired substantially vertical position, pivoting movement of the gear segment 65 is arrested by the disengaging of the teeth of the rack and gear, and by the abutment of a flat surface 68 of the gear segment with the flat upper surface of the square rod 67. As the block 40 continues its movement toward the wall 23 under the urging of the spring 45, the gear segment 65 moves along the rod 67 with the surface 68 sliding along the flat top of the rod.

The cutter assembly is continuously urged into contact with the surface of the pear by a spring 73 (Fig. 1) that is connected between the yoke 35 and a collar 74 adjustably secured to the support tube 33. An upstanding guide plate 75 (Figs. 1 and 3), which is secured by capscrews 76 to a rigid rod 77, projects away from the wall 23, generally parallel to the rod 67. The plate 75 has an outer peripheral edge 78 that limits the inward swinging movement of the support tube 33 so that the cutter assembly 19 will not collide with the fins of the support tube 18 when there is no pear impaled on the tube. It will be understood that the guide plate 75 is so designed and located that it will prevent the cutter from pivoting downwardly to contact the support tube 18, but will permit the cutter to swing inwardly far enough to peel the stem end of the pear. Suitable clutches and switches (not shown) are provided to disconnect the operating mechanisms from the drive means at the end of a peeling cycle.

The cutter assembly 19 (Fig. 5) comprises a front gauge ring 80, a circular cutting blade 81, and a generally cylindrical back gauge ring 82. It will be noted that as the pear P is rotated in a clockwise direction (Fig. 5) the periphery of the pear moves transversely across the cutter assembly from left to right. The left side of each gauge and of the cutting blade, which is the side first contacted by the pear, will be hereinafter referred to as the leading side while the right side of each gauge and of the blade will be called the trailing side. The front gauge 80 has a central bore 84 that is tapped at one end to receive a bolt 85 which holds the cutter 81 and the back gauge 82 in fixed position relative to the front gauge. The forward portion of the front gauge has a shoulder 86 abutting the end of the support tube 33 and a reduced diameter portion 87 rotatably journalled in the support tube. The forward portion of the gauge is also provided with a central opening 88 in which the end of a flexible drive shaft 90 is locked by a setscrew 91. The flexible drive shaft 90 which is shown as a dot-dash line in Fig. 1, extends away from the cutter assembly through the support tube 33 and through a flexible tubular sheathing 92 and is supported in a fixed support 93. The drive shaft 90 is driven from an electric motor 95 through the frictional engagement of a circular drive plate 96, which is keyed to the motor shaft, with a driven wheel 97 keyed to the flexible drive shaft 90.

In Fig. 5 it will be noted that, at the butt end of a pear, there are five high spots which are disposed radially outwardly from the seed cells (shown in dotted lines). Since the pear P is rotated in a clockwise direction (Fig. 5), it is evident that the rapidly rotating cutter assembly 19 will rise and fall as the irregular curved surface of the pear passes therebeneath. During the peeling operation, the cutter will consecutively contact a downwardly sloped surface as in Fig. 6, a substantially level surface as in Fig. 7, and an upwardly inclined surface as in Fig. 8. If the depth of cut is not controlled at all times, the cutter will periodically dig into the surface of the pear and leave lengthwise furrows or grooves which will remain in the surface of the pear when the peeling operation is finished. It will be appreciated that Figs. 6, 7 and 8 illustrate only typical conditions and are not intended to provide an exhaustive study of all conditions of a pear surface or all operating positions of a cutter relative to a fruit surface.

In accordance with the present invention, front and back gauge rings 80 and 82, respectively, are provided on the cutter assembly to control the depth of cut, and these gauges are so designed that the cutter 81 will not dig into the surface of the pear under any normal condition of the pear surface.

In the cutter illustrated in Fig. 6, it will be seen that the front gauge 80 has a forward, steeply inclined portion 100, and a rearward frusto-conical portion 101 that is less steeply inclined. When the surface to be peeled is inclined downwardly, as in Fig. 6, the front gauge 80 takes over the gauging function. It has been found that the performance of the cutter is improved by relieving the entrance edge of the front gauge, as by providing the conical portion 101, or by providing a radius at the entrance edge, as shown at 105 (Fig. 10), on a modified cutter assembly 106. The leading gauge of the cutter of Fig. 10 has a cylinder gauging surface 107 adjacent the cutter.

The back gauge may have a cylindrical surface as in gauge 82 of Fig. 5 or the surface may be frusto-conical as in the gauge 108 of Fig. 10. When the surface to be peeled is inclined upwardly, as in Fig. 8, the back gauge takes over the gauging function. It has been found that superior peeling is obtained when the back gauge is larger in diameter than the front gauge. It may be of substantially the same diameter as the cutter 81 or as small as the diameter of the front gauge 80 plus 50 percent of the difference between the diameter of the knife and the diameter of the front gauge.

When a level surface is to be peeled, as in Fig. 7, the thrust on the pear, resulting from the weight of the cutter, the cutter arm and the pull of the spring 73, is divided between the front and back gauges.

The cutter 81 (Fig. 9) is a typical circular cutting blade having a saw-tooth peripheral cutting edge. It has been found that this type of cutter gives satisfactory results when gauged as described above. A suitable cutter may be from 1¼ to 1½ inches in diameter and should be rotated at approximately 8000 r.p.m., although the size and speed of rotation may be varied. While a circular disc cutter is illustrated it is evident that any type of cutter may be used wherein cutting teeth or a cutting edge is moved in a circular path about an axis. Such cutters will be hereinafter referred to generically as rotary cutters.

In Figs. 11 through 15 a modified arrangement of the pear peeling machine of the present invention is illustrated. This arrangement is particularly adapted to peel a pear P that is impaled on a support tube 110, butt end first instead of stem end first, as in Fig. 1. As seen in Fig. 11, the support tube 110 is secured to a drive shaft 111 by means of a coupling 112. The shaft 111 is journalled in upstanding support walls 113 and 114 and is driven from a motor (not shown) through a belt and pulley drive 115.

A cutter assembly 120 is mounted on the end of a support tube 121 which has a hub 122 pivotally mounted by a pin 123 in a yoke 124. The cutter assembly 120 may be identical to the cutter assembly 19 of Fig. 5 and may be driven from a flexible drive shaft 125 substantially in the same manner as the cutter assembly 19 is driven. The yoke 124 is keyed by a setscrew 127 to a shaft 128 that is rotatably journalled by a pair of aligned bearing sleeves 129 and 130 (Fig. 15) integrally formed on a support block 132. The support block 132 has two upstanding wall portions 134 and 135 and a hub 136 into which an actuating rod 140 (Fig. 12) is threaded. The rod 140, which is slidably journalled in the support walls 113 and 114, is urged toward the right by a spring 142 disposed between the wall 113 and a collar 143 secured to the rod 140. A second collar 145 limits the movement of the rod 140 toward the right.

At the beginning of the peeling operation, the cutter assembly 120 is swung from the position shown in Fig.

11 to the elevated position of Fig. 13 by means of a gear segment 148 (Fig. 12) which is keyed to the shaft 128 and is in mesh with a rack 149. The rack 149 is mounted for guided movement between the wall portions 134 and 135 of the block 132, on the end of a rod 150 which is slidably journalled in the support walls 113 and 114. Movement of the rod 150 is controlled by a barrel cam 152 which is keyed to a longitudinal, rotatable shaft 153 (Fig. 11). The shaft 153 is driven, through a speed reducer 155 and a gear train 156, from the drive shaft 111. A camming surface 160 of the barrel cam abuts a cam roller follower 161 that is secured to a block 163 carried by the sliding rod 150. A spring 165, connected between the support wall 114 and a stud 166 (Fig. 11) projecting from the block 163, normally pulls the block 163 and the rod 150 toward the wall 114 to hold the roller follower 161 against the camming surface 160. Rotation of the rods 150 and 140 is prevented by two stationary guide bars 167 (Fig. 14) that are disposed in guiding relation on opposite sides of the block 163 on rod 150 and on opposite sides of the collar 143 on rod 140.

When the barrel cam is rotated in the direction of arrow 170 (Fig. 12), the follower 161 and the rod 150 are moved toward the left, causing the rack 149 to rotate the gear segment 148 counterclockwise to swing the yoke 124 downwardly to the position of Fig. 13 and to raise cutter assembly 120 up over the butt end of the pear. When the yoke 124 is directly below the shaft 128, and the support tube 121 is in a vertical plane through the axis of the shaft 128, the block 163 contacts the collar 143 (Fig. 12) on the actuating rod 140 to push the rod 140 and the support block 132 toward the left, whereby to move the cutter assembly 120 toward the stem end of the pear. A spring 174 (Fig. 13), connected between the shaft 128 and the cutter support tube 121, maintains a pressure on the tube 121 tending to hold the cutter assembly 120 in contact with the surface of the pear. An upstanding guide plate 175 (Figs. 11 and 13) prevents the cutter 120 from contacting the stemming tube when there is no pear thereon.

To put the machine of Fig. 11 into operation, a pear is impaled on the tube 110 and the rotary cutter 120 is positioned adjacent the center of the butt end of the pear. The barrel cam 152 and the cam follower 161 are then moved to the position shown in Fig. 11. When power is applied, the pear support tube 110 is rotated in the direction of arrow 177 and the barrel cam is rotated in the direction of arrow 170. During the first portion of the rotation of the barrel cam, the sliding rod 150 and the rack 149 are moved toward the left (Fig. 12) to rotate the gear segment 148 in a counterclockwise direction, moving the yoke 124 downwardly and the rotating cutter 120 (Fig. 13) upwardly over the butt end of the pear. Just as the cutter reaches the elevated position of Fig. 13 the block 163 (Fig. 12) on the rod 150 contacts the collar 143 on the rod 140, causing the movement of the rods 140 and 150 as a unit toward the wall 113 to carry the rotating knife along the length of the pear. The spring 174 exerts a pull on the support tube 121 to maintain the cutter in contact with the pear surface. It will be noted in Fig. 13 that, since the support tube 121 is pivoted about pin 123, the cutter will move in toward the axis of the pear as it approaches the stem end of the pear. Since the inward arc of travel of the cutter passes close to the axis of the pear, at every position the cutting edge of the cutter will be substantially on a radius through the pear axis. Accordingly, at every position, the angle between the plane of the cutter and a tangent to the surface of a theoretically round pear through the point of contact is substantially constant.

In Fig. 18 a modified cutter and guide assembly 178 is illustrated. With this arrangement a cutter 179 is keyed to a flexible drive shaft 180 which is disposed inside a support tube 181. A stationary guide assembly 182 is secured on the support tube 181 and comprises a mounting sleeve 182 keyed to the tube by a setscrew 184. A leading gauge 185 is welded to the lower surface of the mounting sleeve 183 and is provided with a gauging surface 185a that slants downwardly toward the cutter 179 and has an arcuate configuration in a plane normal to the axis of the cutter, that extends over a sufficient angular range to maintain contact with the pear as the cutter assembly traverses the curved surface of the pear. A rear gauge 186 is secured to the upper surface of the mounting sleeve 183 and extends over the top of the cutter and down to a position alongside the rear face of the cutter. The rear gauge 186 has a gauging surface 186a of segmental cylindrical configuration having an arcuate extent, in a plane transverse to the axis of the cutter, substantially as great as the arcuate extent of the front gauging surface 185a. This arcuate extent of these two gauging surfaces may be approximately 135 degrees. As seen in Fig. 18 the gauging surface 186a is formed on the arc of a circle larger in diameter than the circle defining the gauging surface 185a. It will be noted that in Fig. 5 the gauges rotate with the cutter while in Fig. 18 the gauges are stationary. In a still further modification the gauges 80 and 82 of Fig. 5 may be formed as centrally-apertured discs that are free wheeling relative to the cutter 81 or one gauge may be free wheeling while the other is positively driven or stationary, or any combination of the three types of gauges may be used. In Fig. 5 the gauging surfaces may be cylindrical or frusto-conical and in Fig. 18 the gauging surfaces are arcuate. If a variation in the depth of cut is desired, the gauges may have elliptical or oval configurations, or the like, to permit an automatic variation in the depth of gauging.

In Fig. 19 one arrangement of a peeler having the above-mentioned free-wheeling gauges is illustrated. In this arrangment a rotary cutter blade 201 is disposed on a support shaft 202 and is keyed thereto by a key 203. The shaft 202 is secured by a setscrew 204 to a flexible drive shaft 205. A leading gauge 208 is mounted for rotation on a reduced diameter portion 202a of shaft 202, and a trailing gauge 209 is mounted for rotation on a further reduced diameter portion 202b of shaft 202. A bolt 210, which is threaded into a tapped, axial opening 202c in shaft 202, bears against a washer 212 to hold the gauges and the cutter blade in assembled position on the shaft.

The machines disclosed in Figs. 1 and 11 are arranged to efficiently peel skin from a pear or the like, leaving a peeled pear that has a contour substantially the same as the contour of the original unpeeled pear surface. However, a portion of the pears that are canned are processed so that the peeled surface of the pear has the predetermined contour which the consuming public associates with a deluxe or premium product. The machine of Fig. 1 may be arranged to contour peel pears by removing the guide plate 75 (Fig. 1) from the rod 77 and replacing it with the guide plate 188 of Fig. 16, and replacing the relatively light spring 73 (Fig. 1) with a stronger spring 189. The plate 188 has a contour, above the reference line 184, which corresponds to the desired, optimum contour. In operation, the spring 189 yieldingly urges the cutter support tube 33 against the contoured surface of the guide plate 188 so that, as the rotary cutter assembly, on the outer end of the tube 33, traverses the length of the pear, it will cut away the unpeeled surface of the pear to a depth dictated by the contour of the guide plate 188. It will be understood that the spring 189 must be strong enough to maintain the tube 33 in contact with the surface of the guide plate 188 at all times.

In Fig. 17 a second arrangement, for contour peeling a pear, is illustrated. A guide plate 190, having a contoured camming groove 192, is adapted to be secured on the rod 77 of Fig. 1 by setscrews 76. The collar 74, on the cutter support tube 33 of Fig. 1, is replaced by a collar 195 which may be rigidly secured to the tube 33 by a setscrew 196. The collar 195 has an integrally formed arm 197 which projects radially from the collar and carries a rotatable roller follower 198 at its outer end. The roller 198 rides in the groove 192 whereby, as the rotary cutter on the end of the tube 33 traverses the length of the pear, the tube 33 and the cutter follow a path controlled by the configuration of the camming groove 192 to obtain a peeled pear having a desired contour.

It will be recognized that, when either the arrangement of Fig. 16 or that of Fig. 17 is used to contour peel pears, neither a front gauge nor a back gauge is necessary on the rotary cutter head.

From the foregoing description it will be recognized that the present invention provides a machine particularly adapted for efficiently peeling pears or the like. The use of front and rear depth gauges of predetermined size and configuration assures continuous and adequate support for the cutting blade at all times. Further, the present cutter head mounting, which permits the spring-urged pivoting of the cutter head about an axis parallel to the axis of rotation of the pear, makes possible the automatic, self-adjusting movement of the cutter head to accommodate surfaces of different inclinations, and also makes possible a simple, efficient method of contour peeling a pear.

Having thus described my invention, what I claim as new and desire to protect by Letters Patent is:

1. A rotary fruit peeler of the type wherein a rotary cutter contacts the surface of the fruit to be peeled and the said surface moves axially with respect to the said cutter, said peeler comprising a support member, a circular cutter blade on said support member, a gauge member operatively associated with said support member on each side of said cutter blade, one of said gauge members having a gauging surface disposed closer to the axis of rotation of said cutter than is the effective cutting edge of said cutter to determine the depth of cut of said cutter blade, and the other of said gauges having a gauging surface at substantially the same distance from the axis of rotation of said cutter as the effective cutting edge of said blade to engage in supporting relation the fruit surface peeled by said blade.

2. A rotary fruit peeler of the type wherein a rotary cutter contacts the surface of the fruit to be peeled and the said surface moves axially with respect to the said cutter, said peeler comprising a support member, a circular cutter blade on said support member, a gauge member operatively associated with said support member on each side of said cutter blade, one of said gauge members having a gauging surface disposed closer to the axis of rotation of said cutter than is the effective cutting edge of said cutter blade, and the other of said gauges having a gauging surface spaced radially from the axis of rotation of said cutter and lying at a position within a range of radial distances from said axis, said range having a maximum value equal to the radius of said cutter and a minimum value equal to the radial distance that the gauging surface of said one gauge member is displaced from said axis plus half the depth of cut of said blade.

3. A rotary fruit peeler of the type wherein a rotary cutter contacts the surface of the fruit to be peeled and the said surface moves axially with respect to the said cutter, said peeler comprising a support member, a circular cutter blade on said support member, a gauge member operatively associated with said support member on each side of said cutter blade, one of said gauge members having a gauging surface disposed closer to the axis of rotation of said cutter than is the effective cutting edge of said cutter to determine the depth of cut of said cutter blade, and the other of said gauges having a gauging surface lying within the diameter defined by the outermost cutting edge of said blade and disposed closer to the path of the peripheral edge of said blade than is the gauging surface of said one gauge to engage in supporting relation the fruit surface peeled by said blade.

4. A rotary fruit peeler of the type wherein a rotary cutter contacts the surface of the fruit to be peeled and the said surface moves axially with respect to the said cutter, said peeler comprising a support member, a circular cutter blade on said support member, a circular gauge member operatively associated with said support member on each side of said cutter blade, one of said gauge members having a gauging surface disposed closer to the axis of rotation of said cutter than is the effective cutting edge of said cutter to determine the depth of cut of said cutter blade, and the other of said gauges having a gauging surface at substantially the same distance from the axis of rotation of said cutter as the effective cutting edge of said blade to engage in supporting relation the fruit surface peeled by said blade.

5. A rotary fruit peeler of the type wherein a rotary cutter contacts the surface of the fruit to be peeled and the said surface moves axially with respect to the said cutter, said peeler comprising a support member, a rotatable circular cutter blade on said support member, a rotatable circular gauge member operatively associated with said support member on each side of said cutter blade, one of said gauge members having a gauging surface disposed closer to the axis of rotation of said cutter than is the effective cutting edge of said cutter to determine the depth of cut of said cutter blade, and the other of said gauges having a gauging surface disposed parallel to the cutter axis and having a diameter within the range of diameters defined by the diameter of the periphery of said circular cutting blade and a diameter equal to the diameter of said one gauge member plus half the difference between the diameter of said blade and the diameter of said one gauge.

6. A rotary fruit peeler of the type wherein a rotary cutter contacts the surface of the fruit to be peeled and the said surface moves axially with respect to the said cutter, said peeler comprising a support member, a circular rotary cutter blade on said support member, a circular gauge member mounted for rotation about said support member on each side of said cutter blade, one of said gauge members having a cylindrical gauging surface disposed closer to the axis of rotation of said cutter than is the effective cutting edge of said cutter to determine the depth of cut of said cutter blade, and the other of said gauges having a cylindrical gauging surface smaller in diameter than said cutter blade but larger in diameter than the cylindrical surface of said one gauge member.

7. A rotary fruit peeler of the type wherein a rotary cutter contacts the surface of the fruit to be peeled and the said surface moves axially with respect to the said cutter, said peeler comprising a support member, a rotatable circular cutter blade on said support member, a circular gauge member operatively associated with said support member on each side of said cutter blade, one of said gauge members having a gauging surface disposed closer to the axis of rotation of said cutter than is the effective cutting edge of said cutter to determine the depth of cut of said cutter blade, and the other of said gauges having a frusto-conical peripheral gauging surface with the portion of said frusto-conical surface that is adjacent said cutting blade being at substantially the same distance from the axis of rotation of said cutter as the effective cutting edge of said blade to engage in supporting relation the fruit surface peeled by said blade.

8. A rotary fruit peeler of the type wherein a rotary cutter contacts the surface of the fruit to be peeled and the said surface moves axially with respect to the said cutter, said peeler comprising a support member, a circular gauge member operatively associated with said support member on each side of said cutter blade, one of said gauge members having a cylindrical gauging surface disposed closer to the axis of rotation of said cutter than is the effective cutting edge of said cutter to determine the depth of cut of said cutter blade and having a frusto-conical peripheral surface on the leading side of said cylindrical surface, and the other of said gauges having a gauging surface at substantially the same distance from the axis of rotation of said cutter as the effective cutting edge of said blade to engage in supporting relation the fruit surface peeled by said blade.

9. A rotary fruit peeler of the type wherein a rotary cutter contacts the surface of the fruit to be peeled and the said surface moves axially with respect to the said cutter, said peeler comprising a support member, a circular cutter blade on said support member, a circular gauge member operatively associated with said support member on each side of said cutter blade, one of said gauge members having a cylindrical gauging surface disposed closer to the axis of rotation of said cutter than is the effective cutting edge of said cutter to determine the depth of cut of said cutter blade and having a rounded edge on the leading side of said cylindrical surface, and the other of said gauges having a gauging surface at substantially the same distance from the axis of rotation of said cutter as the effective cutting edge of said blade to engage in supporting relation the fruit surface peeled by said blade.

10. A rotary fruit peeler of the type wherein a rotary cutter contacts the surface of the fruit to be peeled and the said surface moves axially with respect to the said cutter, said peeler comprising a support member, a circular cutter blade on said support member, a circular gauge member operatively associated with said support member on each side of said cutter blade, one of said gauge members having a cylindrical gauging surface disposed closer to the axis of rotation of said cutter than is the effective cutting edge of said cutter to determine the depth of cut of said cutter blade, and the other of said gauges having a frusto-conical gauging surface with the largest diameter of said frusto-conical surface disposed at substantially the same distance from the axis of rotation of said cutter as the effective cutting edge of said blade to engage in supporting relation the fruit surface peeled by said blade.

11. A rotary fruit peeler of the type wherein a rotary cutter contacts the surface of the fruit to be peeled and the said surface moves axially with respect to the said cutter, said peeler comprising a support member, a circular cutter blade on said support member, a stationary gauge member operatively associated with said support member on each side of said cutter blade, one of said gauge members having an arcuate gauging surface disposed closer to the axis of rotation of said cutter than is the effective cutting edge of said cutter to determine the depth of cut of said cutter blade, and the other of said gauges having an arcuate gauging surface disposed at substantially the same distance from the axis of rotatation of said cutter as is said effective cutting edge.

12. A rotary fruit peeler of the type wherein a rotary cutter contacts the surface of the fruit to be peeled and the said surface moves axially with respect to the said cutter, said peeler comprising a support member, a circular cutter blade on said support member, a circular gauge member mounted in free-wheeling relation on said support member on each side of said cutter blade, one of said gauge members having a gauging surface disposed closer to the axis of rotation of said cutter than is the effective cutting edge of said cutter to determine the depth of cut of said cutter blade, and the other of said gauges having a gauging surface at substantially the same distance from the axis of rotation of said cutter as the effective cutting edge of said blade to engage in supporting relation the fruit surface peeled by said blade.

13. A rotary fruit peeler of the type wherein a rotary cutter contacts the surface of the fruit to be peeled and the said surface moves axially with respect to the said cutter, said peeler comprising a support member, a rotatable circular cutter blade on said support member having a radially projecting disk-like body portion and a plurality of cutting teeth projecting from the periphery of said body portion, a gauge member operatively associated with said support member on each side of said cutter blade, one of said gauge members having a composite peripheral surface comprising a frusto-conical fruit gauging surface with the portion of largest diameter being disposed adjacent the side face of the disk-like body portion of said cutting blade and being smaller in diameter than the circle defined by the outer edges of said cutting teeth and having a frusto-conical guide surface on the inlet side of said gauging surface, said guide surface having a greater inclination than said gauging surface to facilitate engagement of the fruit surface to be peeled with said gauging surface.

14. A rotary fruit peeler of the type wherein a rotary cutter contacts the surface of the fruit to be peeled and the said surface moves axially with respect to the said cutter, said peeler comprising a support member, a circular cutter blade on said support member, a gauge member operatively associated with said support member on each side of said cutter blade, one of said gauge members being of a diameter less than the maximum diameter of said cutter blade to determine the depth of cut of said cutter blade, and the other of said gauges being of a diameter substantially equal to the effective diameter of said cutter blade to engage in supporting relation the fruit surface peeled by said blade.

15. A rotary peeler according to claim 1 wherein said one gauge member is mounted in stationary position relative to said cutter blade and said other gauge member is mounted for rotation with said blade.

16. A rotary peeler according to claim 1 wherein the gauging surface of said one gauge member is formed as a part of a cylinder and the gauging surface of said other gauge is frusto-conical in configuration.

References Cited in the file of this patent

UNITED STATES PATENTS

| | | |
|---|---|---|
| 284,823 | Cottrell | Sept. 11, 1883 |
| 846,765 | Vogel | Mar. 12, 1907 |
| 1,667,502 | Weiss | Apr. 24, 1928 |
| 1,726,722 | Sleeper | Sept. 3, 1929 |
| 1,836,320 | Goranson et al. | Dec. 15, 1931 |
| 1,837,335 | Reinstein et al. | Dec. 22, 1931 |
| 1,872,731 | Goranson et al. | Aug. 23, 1932 |